July 9, 1968 H. K. LOTZ 3,391,918
DEVICE FOR THE REMOVAL OF CUTOFF WORKPIECES IN
CONTINUOUS CASTING INSTALLATIONS
Filed July 26, 1965
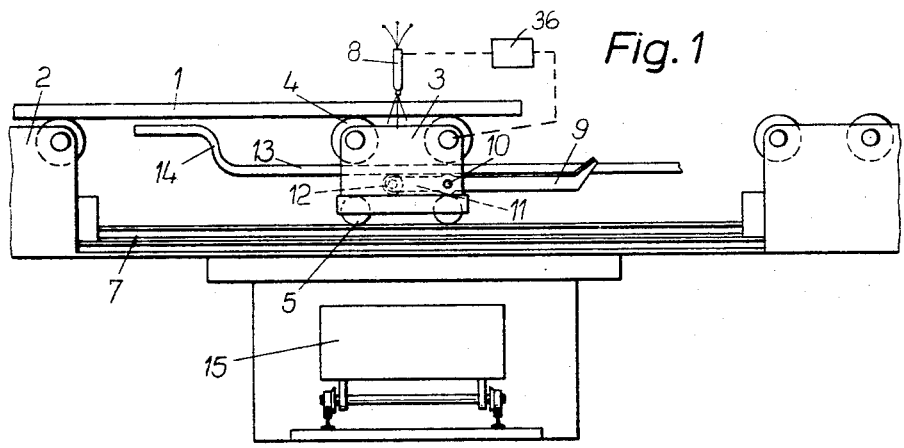
Fig. 1
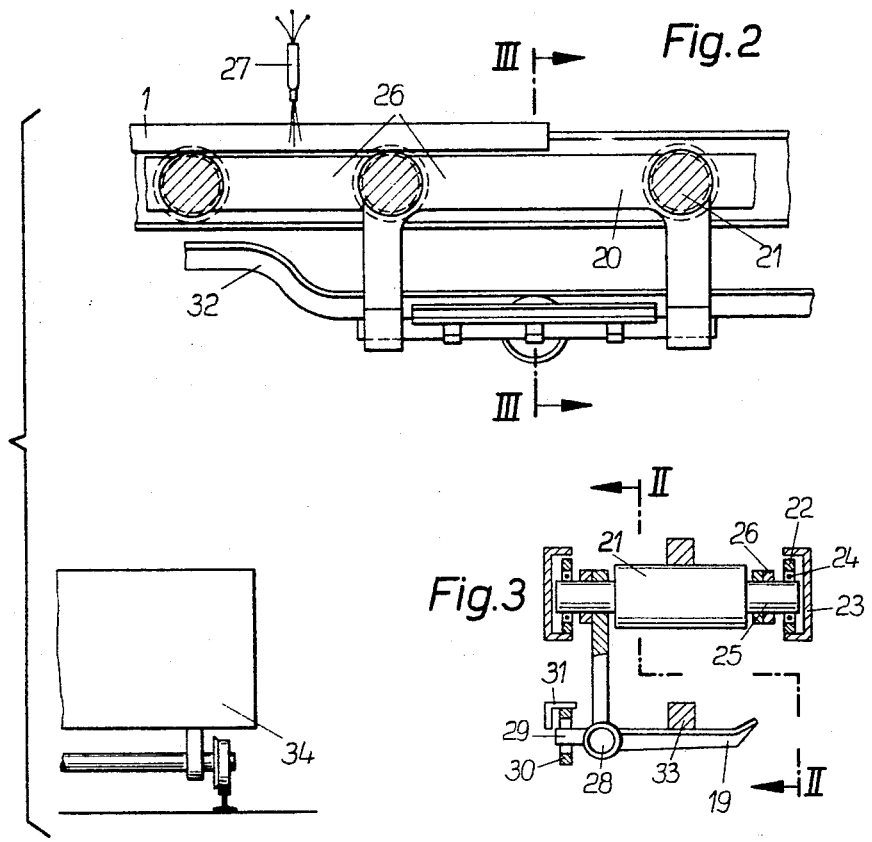
Fig. 2
Fig. 3

United States Patent Office 3,391,918
Patented July 9, 1968

3,391,918
DEVICE FOR THE REMOVAL OF CUTOFF WORKPIECES IN CONTINUOUS CASTING INSTALLATIONS
Horst Karl Lotz, Frankfurt am Main, Germany, assignor to Messer Griesheim G.m.b.H., a corporation of Germany
Filed July 26, 1965, Ser. No. 474,888
8 Claims. (Cl. 266—23)

ABSTRACT OF THE DISCLOSURE

A device for removing cutoff workpieces in continuous casting installations wherein the workpieces are moved in a horizontal plane and are cut by torches above the workpiece, includes a receiving table which is disposed in the area of the cutting operation under the workpiece for receiving the cut workpiece and later discharging it. The receiving table moves in the direction of the workpiece during the cutting operation and changes its position to effect the discharge of the cut workpiece when it returns to its original position.

---

This invention relates to a process and device for removing the cutoff portion of workpieces produced by continuous casting.

In continuous casting installations the removal of cutoff workpieces or ingots (wire bars, iron slabs, sheave blocks, etc.) presents difficulties which require extensive and expensive installations to transport the workpieces from the continuous casting installation to the place of further processing. The previously used roller delivery bed incorporating a transverse direction puller and/or other loading arrangement requires much space and service personnel, especially with installations in which several workpieces are cast simultaneously and then conveyed side by side. The easiest possibility of removing the workpieces would be to let the workpiece drop after the cutting into a groove or cart. However, this process has the following disadvantages:

(1) The workpiece falls uncontrolled into an unprecisely determined place, which requires an encompassing or surrounding removal installation having a strong base corresponding to the cutting length where automatic removal is provided for. The kinetic energy of the falling pieces requires a strong foundation, and the cutting torch also requires a correspondingly protected type of removal device for the downwardly blown cutting slag (iron oxide slag and iron oxide dust). The difficulties become increased by the arrangement of several workpieces in a casting machine side by side or by placing several such casting machines, per se, side by side.

(2) The manual removal of the fallen workpieces can be carried out only between work intervals, since working under the hot tracks and during the torch cutting is impossible.

The considerable weight of the workpieces and the narrow space under the workpiece track lines represent in many cases, an overdemanding bodily exertion if the removal is done by hand.

The falling workpieces additionally can destroy the water channels for the granulation and rinsing of the draining cutting slag or contaminate or can clog them up. The precautions necessary for the avoidance of these damages are very expensive.

(3) The falling workpieces damage devices mounted deeper, e.g. devices which are necessary for the support of the workpiece during the cutting process. These damaged devices must then be removed mechanically or by hand with great difficulty.

These drawbacks or disadvantages disadvantageously affect the economy of the continuous casting installation by waste of material, by being an insufficient and unreliable process in connection which results in high investment, as well as in increased staff or necessary personnel.

An object of this invention is to provide a process and device which overcomes the above-noted drawbacks.

According to this invention, this object is achieved in a simple and advantageous manner by transmitting the workpieces to a take-up device moved synchronously with the cutting device after the workpiece is cut off by the cutting device. The workpieces are then passed along by the take-up device, and are moved synchronously in the same direction as the cutting device. At a predetermined place of its process route the cut workpieces are conveyed to a carrier device for the gathering and removing of the workpieces.

In the inventive process, by means of an additional device at the cutting apparatus, or at a workpiece support which is also conveyed synchronously with the workpiece during the cutting process, the cut workpiece is received in a higher or lower lying position lateral to the oncoming constantly advancing continuous workpiece. Thus, drop passages or chute slides are not so highly or spaciously circumscribed. After the separation process, the cutting installation and workpiece support device proceed to the end of the cutting space and immediately after the end of the cutting they return to their initial position. In this fashion the workpiece is deposited downward or sideways at a precisely predetermined point of the further process route or of the return route by means of the inventive additional attachment which receives the cut workpiece. Significantly, this can be carried out in the starting position. This makes possible a relatively inexpensive removal device. The process thereby distinguishes itself in the first place by depositing the cut workpieces at a predetermined position, and in the second place by receiving the workpiece with a device which is disposed in the cutting apparatus or in a conveyable workpiece support or even in a completely independent device, but which follows along the workpiece, and it deposits the workpiece at a certain place. The trend toward automation of the relatively new continuous casting technique and in its equipment, thus demand in each phase of a fully mechanized production outlet. This holds particularly true for the discontinuous steps or process carried out after the continuous casting operation.

In accordance with an advantageous further development of the invention, a take-up device for the cut workpieces is movably arranged in the area of the process route of the cutting apparatus. The take-up device can be connected with the cutting apparatus; it can be arranged on a cart which serves the workpiece support, or it can be mounted on a workpiece supporting roller chain.

The take-up device suitably consists of a table which can be tilted, lowered, turned or revolved and which is arranged below the continuous workpiece for catching the cut workpieces segments. To actuate the tipping movement of the receiver; mechanical, pneumatic, or kinetic means can be provided. A particularly simple arrangement, for example, comprises having the receiver table connected to a lever which runs along a stationary rail and which guides the tipping movement. The take-up device preferably is provided with a roller running on the rail to be positively and smoothly guided along the rail.

Examples of construction of the invention are represented in the drawing in a simplified, schematic form, and the following is shown:

FIGURE 1 is a side view of an arrangement for carrying out the inventive process in combination with a workpiece support cart;

FIGURE 2 is a cross-sectional view taken through modified FIG. 3 along the line 2—2 of an arrangement for carrying out the inventive process in combination with a roller chain which serves as a workpiece track support; and FIGURE 3 is a cross-sectional view taken through FIG. 2 along the line 3—3.

In FIG. 1 the continuous workpiece is designated as traveling on roller carriage 2, at the end of which the cut workpiece support cart is situated. Cart 3 also has rollers 4 upon which workpiece 1 is situated, and cart 3 travels on wheels 5 upon rails 7. For the division or cutting of the workpiece 1 into individual blocks or the like, cutting torch 8 is provided which is moved on during cutting with workpiece 1 together with support cart 3 by any suitable common drive 36 schematically illustrated in FIG. 1.

Torch 8 is adjusted to move along with and above workpiece 1 at for example the same speed as the workpiece. Accordingly, torch 8 is maintained at the same location above workpiece 1 during their forward movement and torch 8 simultaneously cuts the workpiece. The cutting operation is completed at for example, the end of the forward movement, whereupon torch 8 returns to its original position.

Take-up table 9 arranged at cart 3 is provided to receive the cut workpieces. Table 9 pivots about axis 10 and includes lever 11 with a roller 12. Roller 12 runs along stationary rail 13 during operation of cart 3. When roller 12 contacts bend 14 movement of table 9 is actuated. The individual cut blocks are thus received by table 9 at the end of the forward movement, which is shown in FIG. 1. After receiving the cut blocks, cart 3 moves toward the left of FIG. 1, i.e. opposite the movement of the oncoming workpiece. Roller 12 then rides over bend 14 and the cut blocks are tipped from table 9 into cart 15 arranged under cart 3. The fully loaded cart 15 then transports the workpieces from the continuous casting installation to the place of their further processing.

According to FIGS. 2 and 3, take-up table 19 is located at the roller chain 20, the rollers 21 of which serve as the workpiece support. Wheels 22 of workpiece support roller chain 20 travel in rails 23 and are supported by ball bearings 24. Rollers 21 rotate freely on axes 25 which are connected to a chain by means of clips or links 26. Cutting torch 27 is arranged between two rollers 21 and during cutting, torch 27 is moved together with the roller chain 20 and workpiece 1 at the same speed as previously described. Table 19 is pivotally supported at axis 28 and has a lever 29, the roller 30 of which travels in a stationary rail 31. The rail 31 also has a bend 32 for the control of the tipping movement of table 19. During return or reverse movement of the roller chain 20, when roller 30 reaches the area of bend 32, table 19 tips and the cut workpiece 33 falls into cart 34 wherein the workpieces are then transported on to further processing by the continuous casting equipment.

It is to be understood that the invention is not limited to the exemplified advantageous embodiments described above and represented in the drawings. For example, there are various modification possibilities which can be made without departing from the scope of the invention. For instance, the inventive process is also suitable for the removal of the end still at the beginning of the casting. The iron mold having no solid bottom is sealed by means of the starting bolt, which in casting, forms the start of the workpiece. This starting bolt has a cross-section of the track to be cast and is so long that it is taken up by the driving rollers at the end of a cooling stretch similar to the later oncoming workpiece, and is pulled away with the speed which corresponds to the influx of liquid steel from the dividing groove to the end sill. If the starting bolt, followed by the track, has passed through the driving and other possible straightening rollers, then it is separated piece by piece by means of dissolving simple compounds and removal. These parts can then be used again. On the other hand, if the last short piece of the starting bolt remains welded to the track, it can no longer be used. Accordingly, since this piece can not be used in the further processing of the workpiece material, it must be separated and scrapped together with a workpiece segment. This operation can also be carried out according to the inventive process.

Obviously, many modifications and variations of the present invention are possible in the light of the above teachings. It is, therefore, to be understood that within the scope of the appended claims the invention may be practiced otherwise than as specifically described.

What is claimed is:

1. A device for the removal of cutoff workpieces in continuous casting installations, including means for moving the workpiece in a substantially horizontal plane, cutting means above the workpiece movable in the same direction thereof to effect a cutting operation thereto and movable in a return direction after the cutting operation is effected, characterized by cutoff workpiece receiving means disposed in the area of the cutting operation under the workpiece and having a receiving position and a discharge position, said receiving means being movable in the direction of movement of the workpiece to catch a cutoff workpiece while said receiving means is in said receiving position and said receiving means being movable in a return direction after the cutoff workpiece is caught thereby, and discharge effecting means for changing the position of said receiving means from said receiving position to said discharge position when said receiving means moves in its return direction.

2. A device as set forth in claim 1 wherein said cutting means and receiving means are coupled together for joint movement in the same direction as the movement of the workpiece.

3. A device as set forth in claim 1 wherein said receiving means is mounted on a cart which supports the workpiece in the area of the cutting operation.

4. A device as set forth in claim 1 wherein the means for moving the workpiece in the area of the cutting operation is a supporting roller chain, and said receiving means being mounted on said roller chain.

5. A device as set forth in claim 1 wherein said discharge effecting means includes means for pivoting said receiving means from said receiving position to said discharge position.

6. A device as set forth in claim 5 wherein said receiving means and discharge effecting means include a take-up table, a lever, pivot means between said table and said lever, a guide rail, a bend in said guide rail, and a roller on said lever riding against said guide rail to tip said table when said roller rides against said bend in said guide rail.

7. A device as set forth in claim 6 wherein said table and said lever are mounted on a movable cart, said cart supporting the workpiece in the area of the cutting operation, and said cutting means and said cart being coupled together for joint movement.

8. A device as set forth in claim 6 wherein a supporting roller chain is mounted under the workpiece to support the workpiece on its rollers in the area of the cutting area, said cutting means being arranged between a pair of adjacent rollers, links joining said rollers together, and said pivot means being connected to one of said links.

References Cited

UNITED STATES PATENTS 2,806,263   9/1957   Hogan _____ 164—263
2,973,678   3/1961   Scott et al. _____ 83—157 X J. SPENCER OVERHOLSER, Primary Examiner.

E. MAR, Assistant Examiner.